(12) United States Patent
Lam et al.

(10) Patent No.: US 11,714,562 B2
(45) Date of Patent: Aug. 1, 2023

(54) JOURNAL SCHEME FOR TWO-PASS PROGRAMMING MEMORY DEVICES

(71) Applicant: Micron Technology, Inc., Boise, ID (US)

(72) Inventors: Johnny A. Lam, Firestone, CO (US); Sanjay Subbarao, Irvine, CA (US); Samyukta Mudugal, Erie, CO (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/179,256

(22) Filed: Feb. 18, 2021

(65) Prior Publication Data

US 2022/0187999 A1    Jun. 16, 2022

Related U.S. Application Data

(60) Provisional application No. 63/125,866, filed on Dec. 15, 2020.

(51) Int. Cl.
   *G06F 3/06*    (2006.01)

(52) U.S. Cl.
   CPC .......... *G06F 3/0625* (2013.01); *G06F 3/0647* (2013.01); *G06F 3/0659* (2013.01); *G06F 3/0679* (2013.01)

(58) Field of Classification Search
   CPC .... G06F 3/0625; G06F 3/0647; G06F 3/0659; G06F 3/0679

USPC ........................................................ 711/154
See application file for complete search history.

(56) References Cited

U.S. PATENT DOCUMENTS

| | | | |
|---|---|---|---|
| 2018/0121128 A1* | 5/2018 | Doyle | G06F 3/0644 |
| 2019/0163386 A1* | 5/2019 | Shukla | G06F 3/0659 |
| 2020/0104251 A1* | 4/2020 | Boals | G06F 12/0246 |
| 2020/0211663 A1* | 7/2020 | Baraskar | G11C 16/3459 |
| 2020/0242021 A1* | 7/2020 | Gholamipour | G06F 11/1441 |
| 2021/0342094 A1* | 11/2021 | Liu | G06F 12/124 |
| 2021/0391002 A1* | 12/2021 | Gorobets | G11C 16/10 |

* cited by examiner

*Primary Examiner* — Gautam Sain
(74) *Attorney, Agent, or Firm* — Lowenstein Sandler LLP

(57) ABSTRACT

A memory system identifies, in a logical to physical (L2P) journal associated with a memory device, a first journal entry reflecting a two pass programming operation, where the two pass programming operation includes a first pass to program data to a second memory location identified by a second physical address and a second pass to program a same data to a same second memory location identified by a same second physical address. The system determines whether the second pass of the two pass programming operation is complete. Responsive to determining that the second pass of the two pass programming operation is complete, the system causes a second journal entry of the L2P journal to reference from a first physical address to the second physical address. The system reconstructs the L2P table based on the second journal entry.

20 Claims, 10 Drawing Sheets

223

| Idx | QlcBSNum | SlcBSNum | Batch Update In Progress | Version | |
|---|---|---|---|---|---|
| 0 | x | 0,3,2,1 | 0 | 0 | ⎫ 501 |
| 1 | y | 4,5,6,7 | 1 | 0 | ⎫ 502 |
| 2 | Invalid | Invalid | 0 | 0 | ⎫ 503 |
| 3 | Invalid | Invalid | 0 | 0 | |
| ... | ... | ... | ... | ... | |
| Max queue size | Invalid | Invalid | 0 | 0 | |

| Idx | QlcBSNum | SlcBSNum | Data In SLC |
|-----|----------|----------|-------------|
| 0   | x        | 0,3,2,1  | 0           |
| ... | ...      | ...      | ...         |

Identify, by a processing device, in a logical to physical (L2P) journal associated with a memory device, a first journal entry reflecting a two pass programming operation, wherein the two pass programming operation comprises a first pass to program data to a second memory location identified by a second physical address and a second pass to program a same data to a same second memory location identified by a same second physical address
801

Determine whether the second pass of the two pass programming operation is complete
803

Responsive to determining that the second pass of the two pass programming operation is complete, cause a second journal entry of the L2P journal to reference from a first physical address to the second physical address, wherein the first physical address identifies a first memory location that is programmed with the data
805

Responsive to detecting a power up event following a power loss, reconstruct the L2P table using the second journal entry
807

Identify, by a processing device, in a logical to physical (L2P) journal associated with a memory device, a first journal entry reflecting a two pass programming operation, wherein the two pass programming operation comprises a first pass to program data to a second memory location identified by a second physical address and a second pass to program a same data to a same second memory location identified by a same second physical address
901

Determine whether the two pass programming operation has been interrupted by a power loss event
903

Responsive to determining that the two pass programming operation has been interrupted during a power loss event, cause a second journal entry of the L2P journal to reference from a first physical address to the second physical address, wherein the first physical address identifies a first memory location that is programmed with the data
905

Responsive to detecting a power up event following a power loss, reconstruct the L2P table using the second journal entry
907

FIG. 9

JOURNAL SCHEME FOR TWO-PASS PROGRAMMING MEMORY DEVICES

CROSS-REFERENCE TO RELATED APPLICATION

This application claims the benefit of U.S. Provisional Application No. 63/125,866, title "JOURNAL SCHEME FOR TWO-PASS PROGRAMMING MEMORY DEVICES," filed Dec. 15, 2020, which is incorporated herein by reference in its entirety.

TECHNICAL FIELD

Embodiments of the disclosure relate generally to memory sub-systems, and more specifically, relate to a journal scheme for two-pass programming memory devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 5 illustrates a block diagram of a queue in accordance with some embodiments of the present disclosure.

FIG. 7 illustrates a block diagram of a replay information table in accordance with some embodiments of the present disclosure.

FIG. 8 is a flow diagram of an example method to replay a L2P journal in accordance with some embodiments of the present disclosure.

FIG. 9 is a flow diagram of an example method to replay a L2P journal in accordance with some embodiments of the present disclosure.

DETAILED DESCRIPTION

Figure 1:
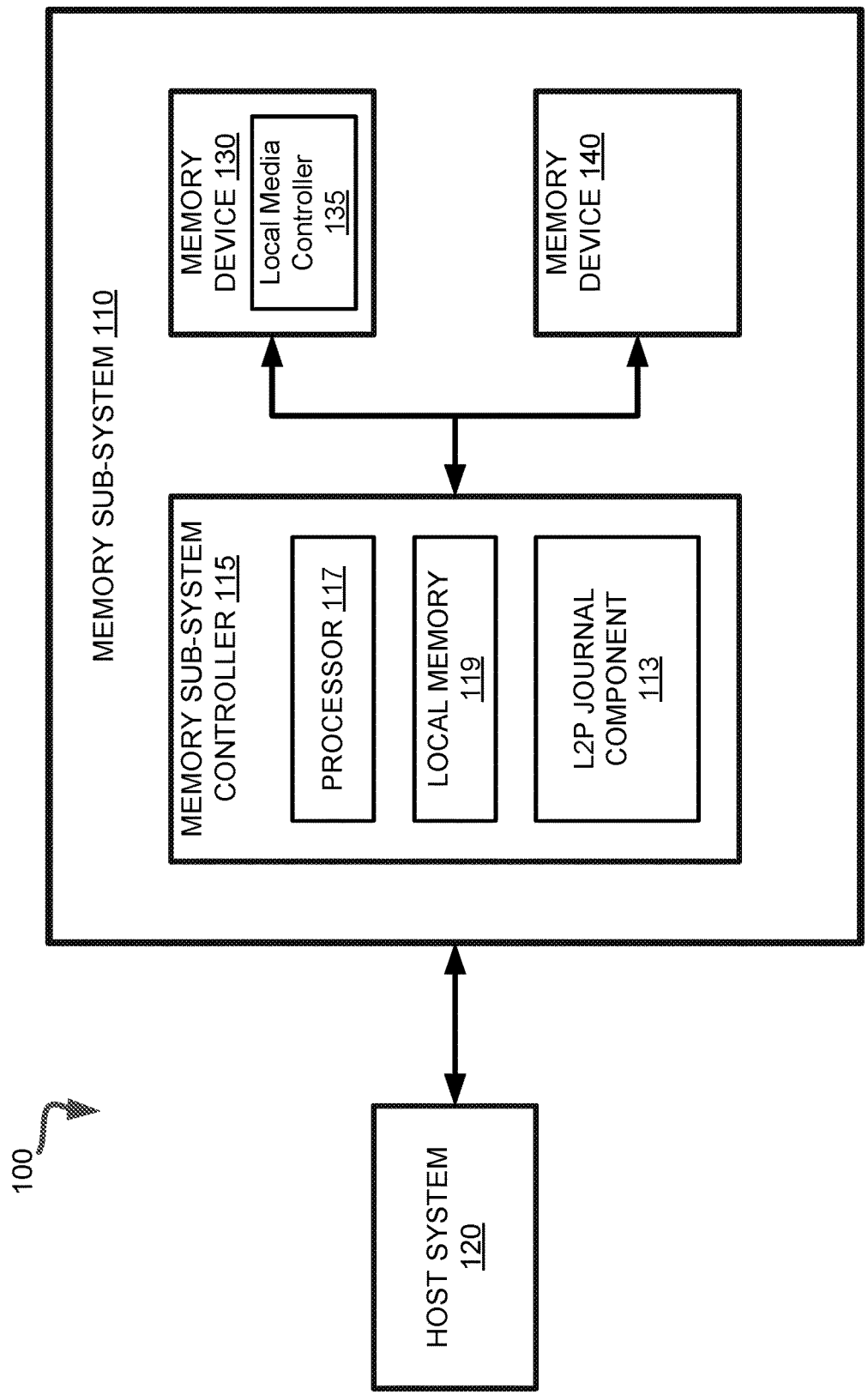
FIG. 1 illustrates an example computing system that includes a memory sub-system in accordance with some embodiments of the present disclosure.

Aspects of the present disclosure are directed to a journaling scheme for two-pass programming memory devices. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can include multiple memory cells arranged in a two-dimensional grid. The memory cells are etched onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types.

In order to isolate, from the host system, various aspects of physical implementations of memory devices employed by memory sub-systems, the memory sub-system can maintain a data structure that maps each logical address to a corresponding physical address (PA). In some implementations, the physical address can include channel identifier, die identifier, page identifier, plane identifier and/or frame identifier. The mapping data structure is referred to herein as a logical-to-physical (L2P) table.

The L2P table can be maintained by the firmware of the memory sub-system controller and can be stored on one or more non-volatile memory devices of the memory sub-system. In order to improve the overall efficiency of the data transfer between a host system and a memory sub-system, the L2P table can at least partially be cached by one or more volatile memory devices of the memory sub-system.

An unexpected power loss event may occur before the L2P table has been fully stored to a non-volatile memory device, thus possibly leaving the L2P table in a state which is inconsistent with the state of memory devices. Accordingly, effective power loss recovery strategies should be able to reconstruct the L2P table to a consistent state that is synchronized with the state of the data stored by the memory sub-system.

Quadruple-level cell (QLC) memory devices, storing a 4-bit value per cell, can introduce a new two-pass programming order in order to mitigate the program disturb, which is caused by cell-to-cell interference where a bit is unintentionally programmed from a "1" to a "0" during a page-programming event. The two-pass programming order specifies that the same data is to be programmed to the same QLC memory twice, via a first pass and a second pass. The first pass programming is not final or the data programmed in the first pass is not ready to service read operations. Data in the second pass is considered finalized and ready to service read operations. The two passes together is a two-pass programming operation. Because the data programmed to the QLC memory is not ready to service read operations until the data is finalized in a second pass, the data is also programmed to a single level cell (SLC) memory cache to be able to service read operations prior to the QLC memory being finalized. The write to the SLC and then the write to QLC would both need to be journaled so the L2P table can be reconstructed from a power loss recovery. The journal keeps track of the changes made to the L2P table by the firmware of the memory sub-system controller.

One approach is to journal once when the data is written to SLC and then again when the data is written to QLC. This approach would double the number of journal entries that would need to be replayed for L2P table reconstruction in response to a power loss event.

Aspects of the present disclosure address the above and other deficiencies by utilizing worklet journal entries along with legacy journal entries, where a worklet journal entry is added to the journal when the memory sub-system identifies a QLC blockstripe for a two-pass programming operation. "Worklet" refers to a set of tasks performed by a two-pass programming operation. A blockstripe is an ordered collection of blocks of a memory device, one from each plane of each die of the memory device, such that the collection of blocks is treated as an elementary programmable unit. When a write to SLC blockstripe(s) is performed, a legacy journal entry is added to the journal and the legacy journal references the SLC blockstripe(s). The legacy journal entry then is to reference the QLC blockstripe when a write to QLC is completed during the second pass of the programming operation. A queue can keep track of the second pass of the two-pass programming that are in progress, as further described in FIG. 5.

Several scenarios can happen for the two-pass programming. In an illustrative example, a power loss event can occur before the two-pass programming, i.e., the write to QLC. In this case, the data is still in SLC and the replay can proceed based on the legacy journal entry referencing the SLC address. In another illustrative example, the power loss event can occur during the two-pass programming, i.e., the write to QLC. In this case, even though the data has likely been migrated to QLC, the L2P table may not be updated. Hence, during replay, the legacy journal entries that correspond to the worklet journal is to refer to the QLC address. Here, the QLC address can be stored in a worklet journal entry for the two pass programming operation. In yet another illustrative example, the power loss event can occur after the two-pass programming is completed. In this case, the memory sub-system would invalidate the block stripe numbers in a worklet that reflects the two pass programming operation. During replay, the legacy journal entries that correspond to the worklet journal entry is to refer to the QLC address using the info in the worklet journal entry. These scenarios can be tracked by respective metadata in the worklet journal entry.

Figure 6:
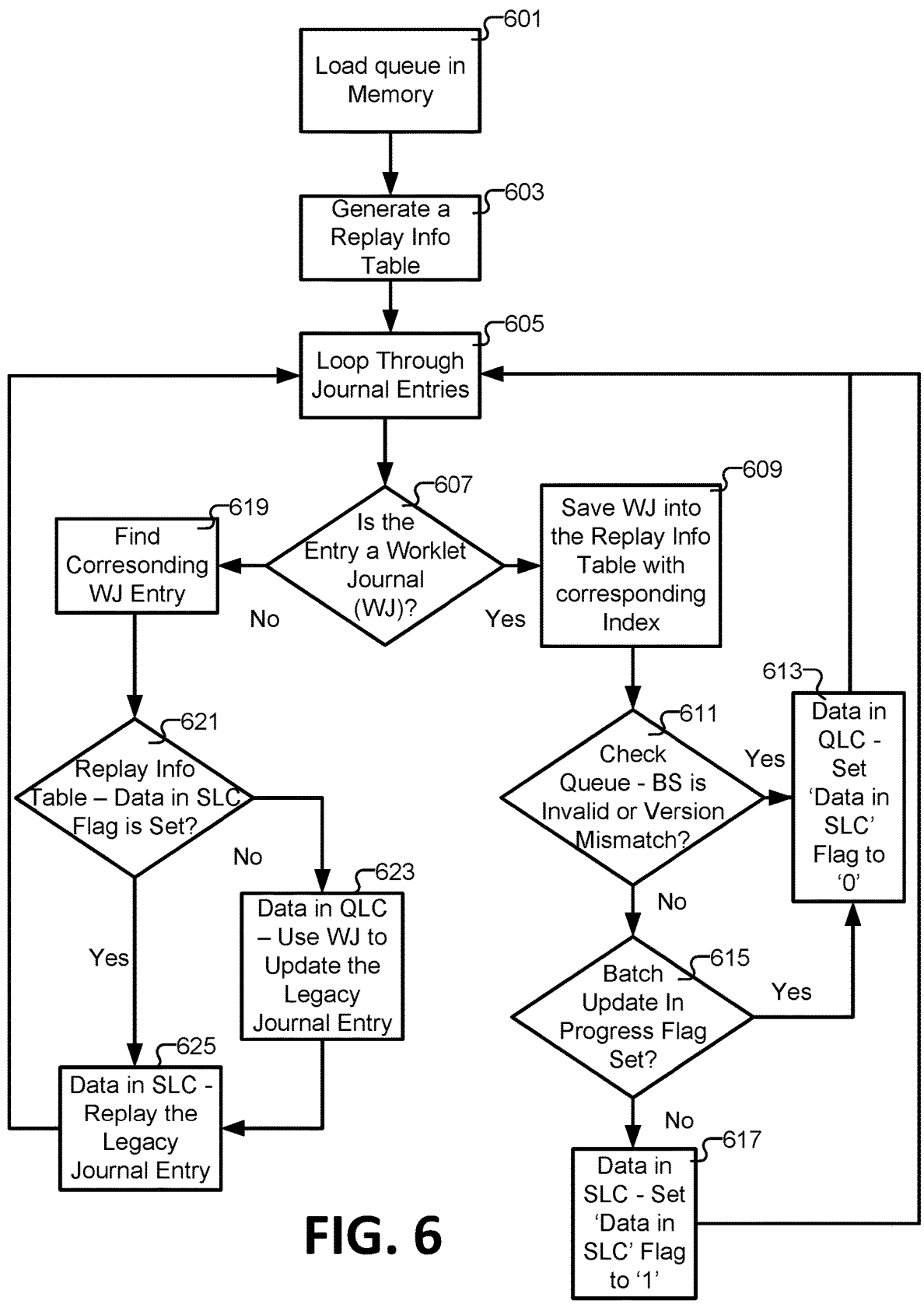
FIG. 6 illustrates a flow chart to replay a L2P journal in accordance with some embodiments of the present disclosure.

During replay, a replay information (info) table (a temporary table that is created during a journal replay) can be used to decide whether the legacy journal entries are to refer to the QLC address or the SLC address, as further described in FIG. 6. This way, replaying the legacy journal entries to refer to a SLC address or a QLC address avoids replaying the programming to the SLC address and then again the programming to the QLC address.

Various aspects of the above referenced methods and systems are described in details herein below by way of examples, rather than by way of limitation.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

In one embodiment, memory sub-system 110 includes an L2P journaling component 113 that can manage L2P operations journaling. In particular, L2P journal component can journal entries for two-pass programming operations, where a two-pass programming operation first writes data to SLC and then migrates the data to QLC. Following a power up event after a power loss, L2P journal component 113 can replay the journal entries to reconstruct a L2P table. In some embodiments, memory sub-system controller 115 includes at least a portion of L2P journal component 113. In some embodiments, L2P journal component 113 is part of host system 110, an application, or an operating system. In other embodiments, local media controller 135 includes at least a portion of L2P journal component 113 and is configured to perform the functionality described herein. Further details with regards to the operations of L2P journal component 113 are described below.

Figure 2:
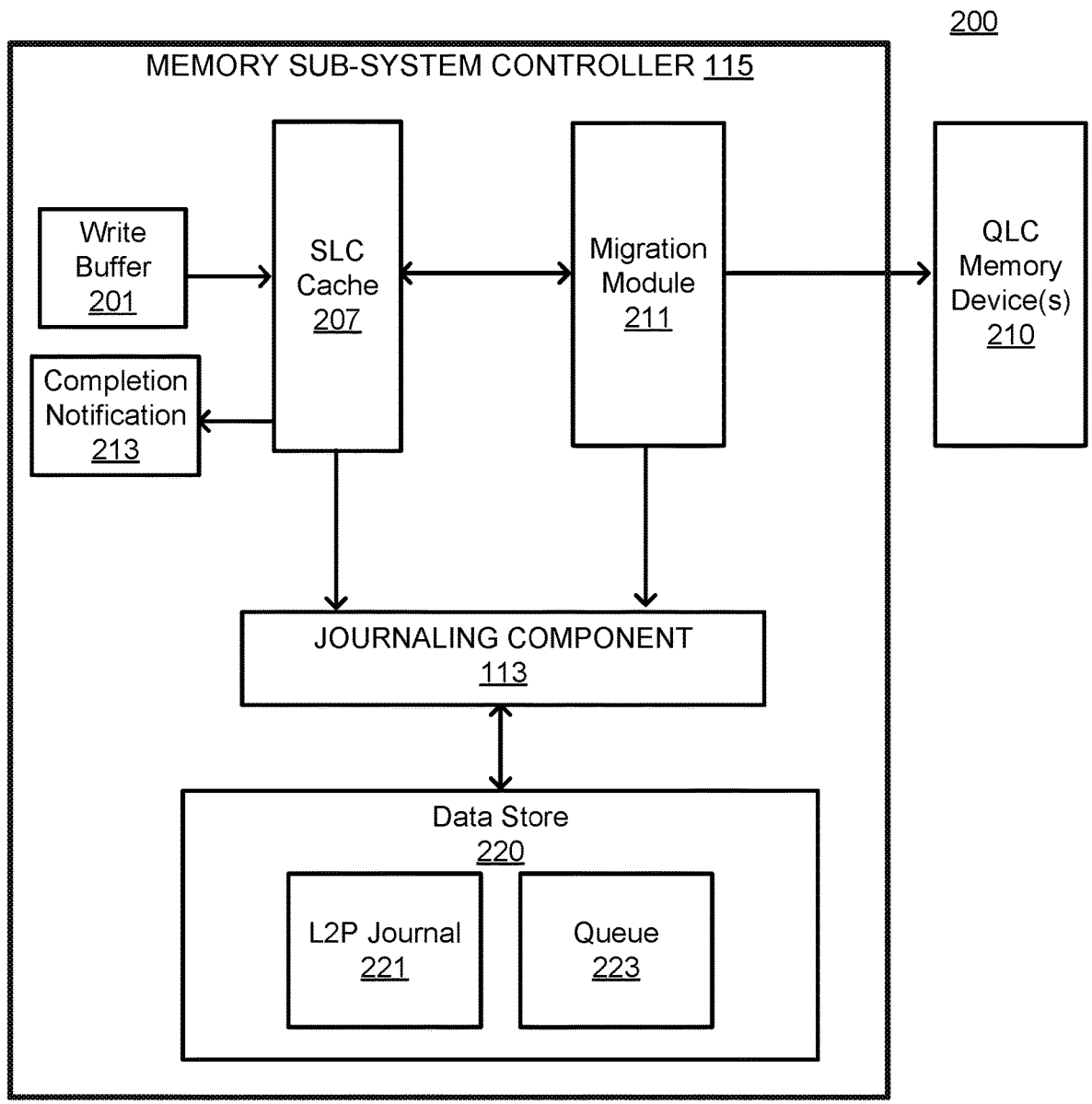
FIG. 2 illustrates a block diagram of a system that performs two-pass programming operations in accordance with some embodiments of the present disclosure.

FIG. 2 illustrates a block diagram of a system that performs two-pass programming operations in accordance with some embodiments of the present disclosure. System 200 can represent memory sub-system 110 of FIG. 1. Referring to FIG. 2, system 200 can include quad-level cell (QLC) memory device 210 (as part of memory devices 130-140) and memory controller 115. Memory controller 115 can include write buffer 201, single-level cell (SLC) cache 207, L2P journal component 113, migration modules 211, and completion notification 213.

Write buffer 201 can store write commands submitted to the memory sub-system by the host system 120 and/or write commands initiated by controller 115 (e.g., garbage collection). Controller 115 can execute the write commands to SLC blockstripes in the SLC cache 207.

The QLC memory device 210 can be part of memory devices 130-140. In some embodiments, SLC cache 207 can be part of controller 115 or memory devices 130-140.

Migration modules 211 can migrate data from SLC cache 207 to QLC memory device 210. For example, migration module 211 can assign a set of SLC and QLC blockstripes. When the set of SLC blockstripes (as part of SLC cache 207) reaches a predetermined threshold of capacity (e.g., full), migration module 211 can migrate the data from the set of SLC blockstripes to the QLC blockstripe for a two-pass programming operation to be performed at the QLC blockstripe. In one embodiment, migration module 211 can be a standalone module. In another embodiment, migration module 211 is integrated with L2P journal component 113 and/or memory controller 115. Memory controller 115 can communicate to a host 120, a notification the memory operation has been completed.

Further, L2P journal component 113 can store, in data store 220, journal entries in L2P journal 221, and can store worklets in queue 223. Data store 220 can be part of local memory 119 and/or memory devices 130-140.

System 200 can perform a two-pass programming operation to write data to QLC memory device 210. Prior to the two-pass programming operation, to ensure the data is available, the data is first written to SLC cache 207. When the write operation completes, a completion notification 213 is sent back to the party that initiated the write operations. In one embodiment, when the SLC cache 207 accumulates at least a predetermined amount of stored data, migration module 211 migrates the data from SLC cache 207 to QLC memory device 210 (e.g., a batch update). For example, the predetermined threshold of stored data can be 4 SLC blockstripes. E.g., when SLC cache 207 accumulates 4 SLC blockstripes of valid data, migration module 211 initiates a migration of data from the 4 SLC blockstripes to 1 QLC blockstripe. For the migration, the same data is programmed to the same QLC blockstripe twice (a first pass and a second pass) to finalize the data.

When a memory controller writes data to the SLC cache, L2P journal component 113 adds a legacy journal entry to the L2P journal. The legacy journal entry includes a reference to an address in the SLC cache where the data is written. When the memory controller assigns QLC blockstripe(s) to the SLC blockstripe(s) for a two-pass programming operation, L2P journal component 113 adds a worklet journal entry to the L2P journal. The worklet journal entry includes an identifier of an entry (such as entry 501 in FIG. 5) in a queue (as further discussed in FIG. 5). The worklet journal entry can also include a version number. The version number ensures a referenced entry in the queue is the same version as the worklet journal entry. The worklet journal entry can also include one or more identifiers of the SLC blockstripe(s), which are locations in a SLC cache where the data would be programmed, and can further include an identifier of the QLC blockstripe(s), which is the location in the QLC memory device where the data would be programmed.

Figure 3:
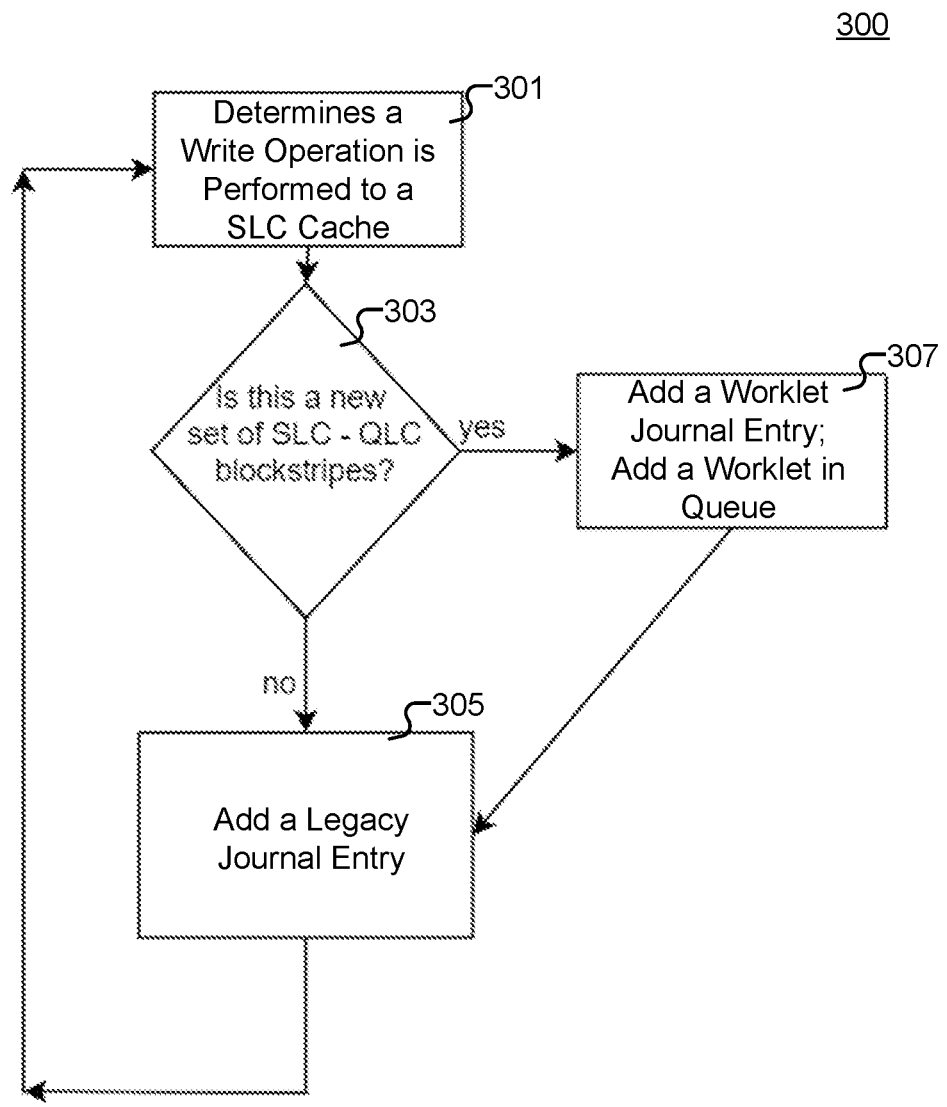
FIG. 3 illustrates a flow chart for journaling a two pass programming operation in accordance with some embodiments of the present disclosure.

FIG. 3 illustrates a flow chart of a method of journaling a two pass programming operation in accordance with some embodiments of the present disclosure. Method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the operations of flow chart 300 are performed by L2P journal component 113 of FIG. 1.

At operation 301, processing logic determines (via memory controller 115) whether a write operation is performed with respect to a SLC cache 207. The write operations can be initiated by host 120 or controller 115.

At operation 303, processing logic determines whether the write operation involves a new set of SLC-QLC blockstripes. An example set can be 4 SLC blockstripes and 1 QLC blockstripe. Initially, processing logic can assign a new set of SLC-QLC blockstripes for write operations. Write operations can be performed sequentially in the 4 SLC blockstripes. When the 4 SLC blockstripes are full, the 4 SLC blockstripes are migrated to the QLC blockstripe. The QLC blockstripe can be selected sequentially for programming.

At operation 305, if the write operation does not involve a new set of SLC-QLC blockstripes, processing logic adds a legacy journal entry to L2P journal 221. The legacy journal entry includes a SLC blockstripe number referring to the physical location for the write operation. The legacy journal entry can be replayed to reconstruct a L2P table after a power up event following a power loss.

At operation 307, if the write operation involves a new set of SLC-QLC blockstripes, processing logic adds a worklet journal entry to L2P journal 221. The worklet journal entry includes information of the SLC-QLC blockstripes. The worklet journal entry can be used to indicate that there are corresponding legacy journal entries for the set of SLC-QLC blockstripes, as further discussed in FIG. 4. Processing logic further adds a worklet to queue 223. The worklet journal entry can keep track of the two-pass programming operation in progress (e.g., if the data migration is in progress, completed, or not yet started). L2P journal component 113 can use the worklet journal and a replay information table to determine if the legacy journal entries should instead refer to a QLC blockstripe number, as further discussed in FIG. 5.

Figure 4:
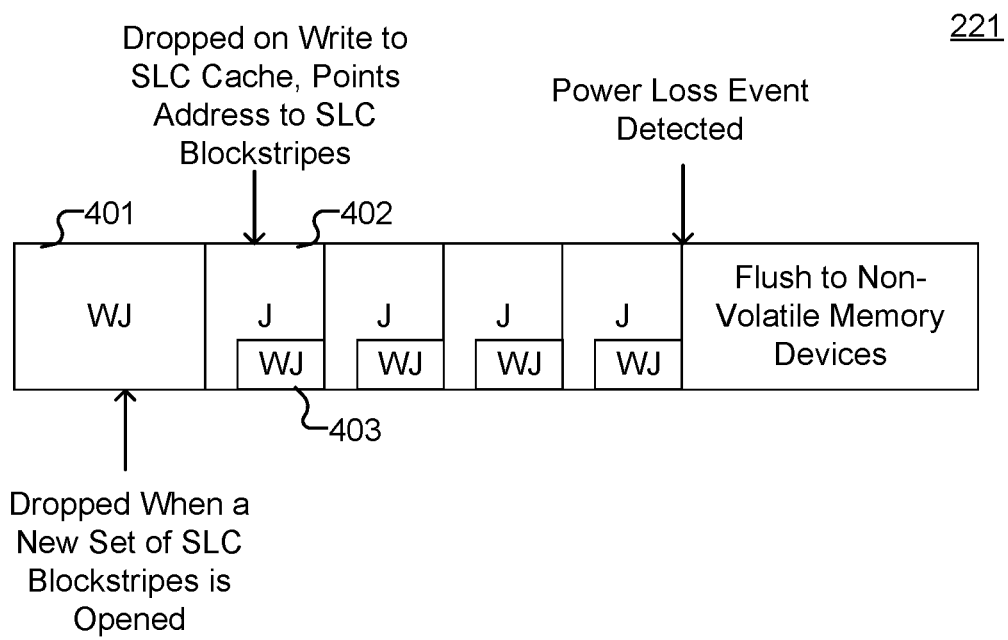
FIG. 4 illustrates a block diagram of a logical to physical (L2P) journal in accordance with some embodiments of the present disclosure.

FIG. 4 illustrates an example structure of a logical to physical (L2P) journal in accordance with some embodiments of the present disclosure. L2P journal 221 includes journal entries for write operations to a memory device. The journal entries can be replayed to reconstruct a L2P table for the memory device. L2P journal 221 can be stored in local memory 119 and/or non-volatile memory devices 130-140.

L2P journal 221 can include two types of entries, a worklet journal entry and a legacy journal entry. L2P journal component 113 can insert a worklet journal entry to L2P journal 221 in response to a new set of SLC-QLC blockstripes being assigned. L2P journal component 113 can insert a legacy journal entry to L2P journal 221 in response to a write to a SLC cache.

For example, referring to FIG. 4, in one embodiment, when migration module 211 identifies a new set of SLC-QLC blockstripe number(s), migration module 211 reports this identification to L2P journal component 113 and L2P journal component 113 inserts a worklet journal entry 401 to L2P journal 221. The set of SLC blockstripe number(s) can be identified sequentially, when a new page is programmed to the SLC cache 207, as described in FIG. 3. The QLC blockstripe can be identify as the next available blockstripe for programming, e.g., sequentially.

Worklet journal entry 401 can include an identifier of an entry (such as entry 501 in FIG. 5) in a queue (as further discussed in FIG. 5). In one embodiment, worklet journal entry 401 can include a version number. The version number ensures that a referenced entry in the queue is the same version as the worklet journal entry. In one embodiment, worklet journal entry 401 can include one or more identifiers of the SLC blockstripe(s), which are locations in a SLC cache where the data is previously programmed, and can further include one or more identifiers of the QLC blockstripe(s), which is the location in the QLC memory where the data would be programmed.

When L2P journal component 113 detects that the memory controller performed a write to the SLC cache 207, L2P journal component 113 inserts a legacy journal entry 402 to L2P journal 221. Legacy journal entry 402 includes information to reconstruct the L2P journal, such as the SLC blockstripe number(s) where the data is being stored. In one embodiment, legacy journal entry 402 includes an identifier of the worklet journal entry. Here, the SLC-QLC blockstripes are already assigned and the worklet journal entry is already created for the two-pass programming (see operation 307 of FIG. 3). Legacy journal entry 402 can be a SLC write and legacy journal entry 402 can reference worklet journal entry 401 via reference 403. Worklet journal entry 401 can refer to the assigned SLC-QLC blockstripe number(s). Worklet journal entry 401 can also refer to a queue entry (such as entry 501 in FIG. 5) as further described in FIG. 5.

In one embodiment, L2P journal entries 401-402 may be stored in local memory 119 and/or on a volatile memory device 130-140 of FIG. 1. When a graceful power loss event is detected, L2P journal component 113 flushes L2P journal entries 401-402 to non-volatile memory devices 130-140 to persist the L2P journal entries 401-402. In another embodiment, in anticipation of an asynchronous power loss event, L2P journal component 113 periodically flushes L2P journal entries 401-402 to non-volatile memory devices 130-140, at predetermined time intervals or when the journal entries in local memory 119 reach a predetermined size.

In addition to the worklet journal entries, a queue can keep track of the status of the two-pass programming. The queue can be created and used by L2P journal component 113. FIG. 5 illustrates a block diagram of a queue in accordance with some embodiments of the present disclosure. Queue 223 refers to a table that stores information about the two-pass programming operations. In one embodiment, queue 223 can store information for the two-pass programming operations as worklets. Queue 223 can be stored in local memory 119 and flushed to a non-volatile memory in response to the memory controller detecting a power loss event.

Referring to FIG. 5, each of the rows 501-503 can represent a worklet, or a migration for the two-pass programming operation. A worklet can include an index value unique to the worklet, the SLC blockstripe number(s) and the QLC blockstripe number(s) for the set of SLC-QLC blockstripes corresponding to the two-pass programming operation. In one embodiment, the worklet can include a version number. The version number ensures that a worklet journal entry (such as worklet journal entry 401 of FIG. 4) refers to the correct version of the worklet.

In one embodiment, when L2P journal component 113 detects that the memory controller has opened a new set of SLC-QLC blockstripes for a two-pass programming operation, L2P journal component 113 inserts a worklet 501 into queue 223. Worklet 501 includes an index value, the SLC blockstripe numbers, and the QLC blockstripe numbers. The worklet index value can be a numeric value.

In one embodiment, queue 223 can include a bit field indicating whether a batch update is in progress. The bit field can be used to track a status of the SLC to QLC migration. In one embodiment, L2P journal component 113 sets the field to '1' when migration module 211 begins a migration, as shown by worklet entry 502. When migration module 211 completes the migration, journal component 113 clears the batch update in progress field to '0' and invalidates the SLC blockstripe number and the QLC blockstripe number, as shown in worklet entry 503. As noted herein above, migration refers to data being moved from multiples of SLC blockstripes to one or more QLC blockstripes as part of a two-pass programming.

The L2P journal of FIG. 4 and the queue of FIG. 5 can be flushed to a non-volatile memory devices 130-140 in response to an asynchronous power loss and can be flushed in response to a notification of a controlled power loss. The L2P journal and the queue can be retrieve on boot up. This way, the most up-to-date L2P journal 221 and the queue 223 can be used to reconstruct a L2P table.

FIG. 6 illustrates a flow chart of a method of replaying a L2P journal for L2P table reconstruction in accordance with some embodiments of the present disclosure. Operations 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the operations 600 are performed by controller 115 or L2P journal component 113 of FIG. 1.

At operation 601, processing logic loads the queue (e.g., queue 223) from non-volatile memory into local memory.

At operation 603, processing logic generates a replay information (info) table (e.g., table 700 of FIG. 7). The replay info table is a temporary table that is created during a journal replay. The replay info table can store a flag indicating whether the data for a two-pass programming operation is in the SLC blockstripes. Example of a replay info table is illustrated in FIG. 7. The replay info table can have four fields, index, QLC blockstripe number(s), SLC blockstripe number(s), and a "data in SLC" flag. The replay info table can be initialized to have the same number of entries as queue 223 of FIG. 5. Referring to FIG. 7, the entries in the replay info table can be populated in-flight (as illustrated by operation 605). The SLC and QLC blockstripe number(s) of the entries can be populated from the worklet journal entry from the L2P journal. Finally, the "data in SLC" flag indicates whether the data is in the SLC blockstripe(s) or has migrated to the QLC blockstripe(s).

At operation 605, processing logic loops through each entry of the journal entries in a L2P journal (e.g., L2P journal 221 of FIG. 2).

At operation 607, processing logic determines if the entry is a worklet journal entry.

At operation 609, if the entry is a worklet journal entry, processing logic stores the worklet journal entry information (SLC and QLC blockstripe number(s)) into the replay info table. In one embodiment, the entry in the replay info table can have corresponding index to the entries in queue 223.

At operation 611, based on an index value from the worklet journal entry, processing logic retrieves a worklet from the queue. Process logic determines if the blockstripe number(s) in the worklet is invalidate or if the version number in the worklet mismatches that of the worklet journal entry.

At operation 613, if yes, processing logic determines that the data has migrated to the QLC blockstripe. Processing logic then sets the "data in SLC" flag to '0'.

At operation 615, if no, processing logic determines from the worklet if the "batch update in progress" flag is set. If yes, processing logic proceeds to operation 613, and processing logic sets the "data in SLC" flag to '0'.

At operation 617, if no, processing logic determines that the data is still in the SLC blockstripe(s). Processing logic then sets the "data in SLC" flag to '1'.

At operation 619, if the entry is not a worklet journal entry, e.g., the entry is a legacy journal entry, processing logic finds the corresponding worklet journal entry in the L2P journal. For example, the legacy journal entry can contain a reference to the corresponding worklet journal entry. Processing logic can locate, using the reference, the worklet journal entry in the L2P journal.

At operation 621, processing logic determines, from the replay info table, if the "data in SLC" flag is set.

At operation 623, if no, processing logic uses the worklet journal entry to update the legacy journal entry. For example, the SLC blockstripe number in the legacy journal entry is updated to the QLC blockstripe number indicated by the worklet journal entry. In another embodiment, processing logic indicates the legacy journal entry should refer to the QLC blockstripe number for replay without modifying the legacy journal entry. Since the data has migrated from the SLC blockstripes to the QLC blockstripe(s), the QLC blockstripe number is used for L2P table reconstruction. Next, processing logic proceeds to operation 625.

At operation 625, if yes, processing logic replays the legacy journal entry. E.g., if the data still resides in the SLC blockstripe(s), the legacy journal entry is replayed with the SLC blockstripe number(s), as it was originally inserted in the L2P journal. If the data has migrated to the QLC blockstripe(s), processing logic replays the legacy journal entry using the QLC blockstripe number(s). Once reconstructed, the L2P table can be used to translate a host logical address to a memory device physical address. The memory device physical address can correspond to a SLC blockstripe(s) number or a QLC blockstripe(s) number.

In summary, a modified L2P journal has both worklet journal entries and legacy journal entries. The modified L2P journal, along with supporting worklets from a queue, are used to reconstruct a L2P table, where the reconstruction reduces the replays from two replays (SLC programming and QLC programming) to one replay (either SLC programming or QLC programming).

FIG. 8 is a flow diagram of an example method to replay a L2P journal in accordance with some embodiments of the present disclosure. The method 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 is performed by the L2P journal component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 801, processing logic identifies, in a logical to physical (L2P) journal associated with a memory device, a first journal entry (worklet journal entry) reflecting a two pass programming operation, where the two pass programming operation includes a first pass to program data to a second memory location (QLC memory device) identified by a second physical address (QLC blockstripe number(s)) and a second pass to program a same data to a same second memory location identified by a same second physical address. When a new set of SLC-QLC blockstripes is assigned by the memory controller, L2P journal component 113 inserts the worklet journal entry in the L2P journal.

At operation 803, processing logic determines whether the second pass of the two pass programming operation is complete. When memory controller assigns the new set of SLC-QLC blockstripes, L2P journal component 113 inserts a worklet in a queue. The worklet is assigned an index value and the index value is stored in the worklet journal entry tracking the SLC-QLC blockstripes. Using the worklet in the queue (as illustrated in FIG. 5), L2P journal component 113 looks up the SLCBSNum, QLCBSNum, or the Version fields. An "invalid" SLCBSNum/QLCBSNum or a mismatch in version compared to the worklet journal entry indicates the second pass of the two pass programming operation is complete.

At operation 805, responsive to determining that the second pass of the two pass programming operation is complete, processing logic causes a second journal entry (legacy journal entry) in the L2P journal corresponding to the first pass to reference from a first physical address to the second physical address, where the first physical address (SLC blockstripe number(s)) identifies a first memory location (SLC cache) that is programmed with the data. For example, processing logic can indicate, via the "data in SLC" flag, the data is in the QLC blockstripe(s). If the second pass of the two pass programming operation is complete, a "data in SLC" flag in the replay info table is updated to a "0" value to indicate the data is in the QLC blockstripe(s).

The legacy journal entry is previously added when the memory controller performs a SLC write. The legacy journal entry refers to the first memory address (a SLC blockstripe(s) number). The first memory address is updated to the second memory address (a QLC blockstripe(s) number) since the memory controller completed the write to the QLC blockstripe(s).

At operation 807, processing logic reconstructs the L2P table based on the second journal entry responsive to detecting a power up event following a power loss. The reconstruction is perform by replaying the legacy journal entries in the L2P journal. These legacy journal entries can either refer to the first memory address (SLC), or (via an indication) the second memory address (SLC). The indicator can be the "data in SLC" flag in the replay info table.

In one embodiment, processing logic further programs the data in the first memory location comprises a set of single level cell (SLC) blockstripes and migrates the data from the first memory location to the second memory location for the two pass programming operation, wherein the second memory location comprises a quad level cell (QLC) blockstripe.

In one embodiment, programming the data in the first memory location include adding the second journal entry to the L2P journal, where the second journal entry indicates that the data is programmed at the first memory location identified by the first physical address. In one embodiment, processing logic further adds the first journal entry to the L2P journal in response to identifying the QLC blockstripe for the two pass programming operation, where the first journal entry indicates that the data is programmed by the two pass programming operation.

In one embodiment, processing logic further adds an entry to a queue in response to identifying the QLC blockstripe for the two pass programming operation. Processing logic takes a snapshot of the queue at a power loss event, where the queue entry indicates whether the two pass programming operation is in progress.

In one embodiment, processing logic performs, based on the second journal entry, a L2P translation by translating a logical address to the second physical address corresponding to the second pass instead of the first physical address. In one embodiment, the power loss event is an asynchronous power loss event or a controlled power down event.

FIG. 9 is a flow diagram of an example method to replay a L2P journal in accordance with some embodiments of the present disclosure. The method 900 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 900 is performed by the L2P journal component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 901, processing logic identifies, in a logical to physical (L2P) journal associated with a memory device, a first journal entry (worklet journal entry) reflecting a two pass programming operation, where the two pass programming operation comprises a first pass to program data to a second memory location (a QLC memory device) identified by a second physical address (QLC blockstripe number(s)) and a second pass to program a same data to a same second memory location (the QLC memory device) identified by a same second physical address (the QLC blockstripe number(s)).

At operation 903, processing logic determines whether the two pass programming operation has been interrupted by a power loss event. The power loss event can be an asynchronous power loss or a controlled power down. While a migration module is performing a batch update and the memory sub-system loss power, the L2P journal probably did not update or persist, even though data has migrated to the QLC blockstripe(s). In this case, using the worklet in the queue (as illustrated in FIG. 5), L2P journal component 113 looks up the "batch update in progress" field. A "1" value indicates a migration that is in progress while interrupted by the power loss event.

At operation 905, responsive to determining that the two pass programming operation has been interrupted by a power loss event, processing logic causes a second journal entry in the L2P journal to reference from a first physical address to the second physical address, where the first physical address identifies a first memory location that is programmed with the data. For example, processing logic can indicate, via the "data in SLC" flag, whether the data is in the QLC blockstripe(s). If the second pass of the two pass programming operation is in progress, the "data in SLC" flag in the replay info table is updated to a "0" value to indicate the data has migrated to the QLC blockstripe(s).

At operation 907, processing logic reconstructs the L2P table based on the second journal entry responsive to detecting a power up event following a power loss.

In one embodiment, processing logic programs the data in the first memory location comprises a set of single level cell (SLC) blockstripes. Processing logic migrates the data from the first memory location to the second memory location for the two pass programming operation, wherein the second memory location comprises a quad level cell (QLC) blockstripe. In one embodiment, programming the data in the first memory location includes adding the second journal entry to the L2P journal, where the second journal entry indicates that the data is programmed at the first memory location identified by the first physical address.

In one embodiment, processing logic further adds the first journal entry to the L2P journal in response to identifying the QLC blockstripe for the two pass programming operation, where the first journal entry indicates that the data is programmed by the two pass programming operation. In one embodiment, processing logic further adds an entry to a queue in response to identifying the QLC blockstripe for the two pass programming operation, and takes a snapshot of the queue at a power loss event, where the queue entry indicates whether the two pass programming operation is in progress. In one embodiment, processing logic further performs, based on the updated second journal entry, a L2P translation by translating a logical address to the second physical address instead of the first physical address.

Figure 10:
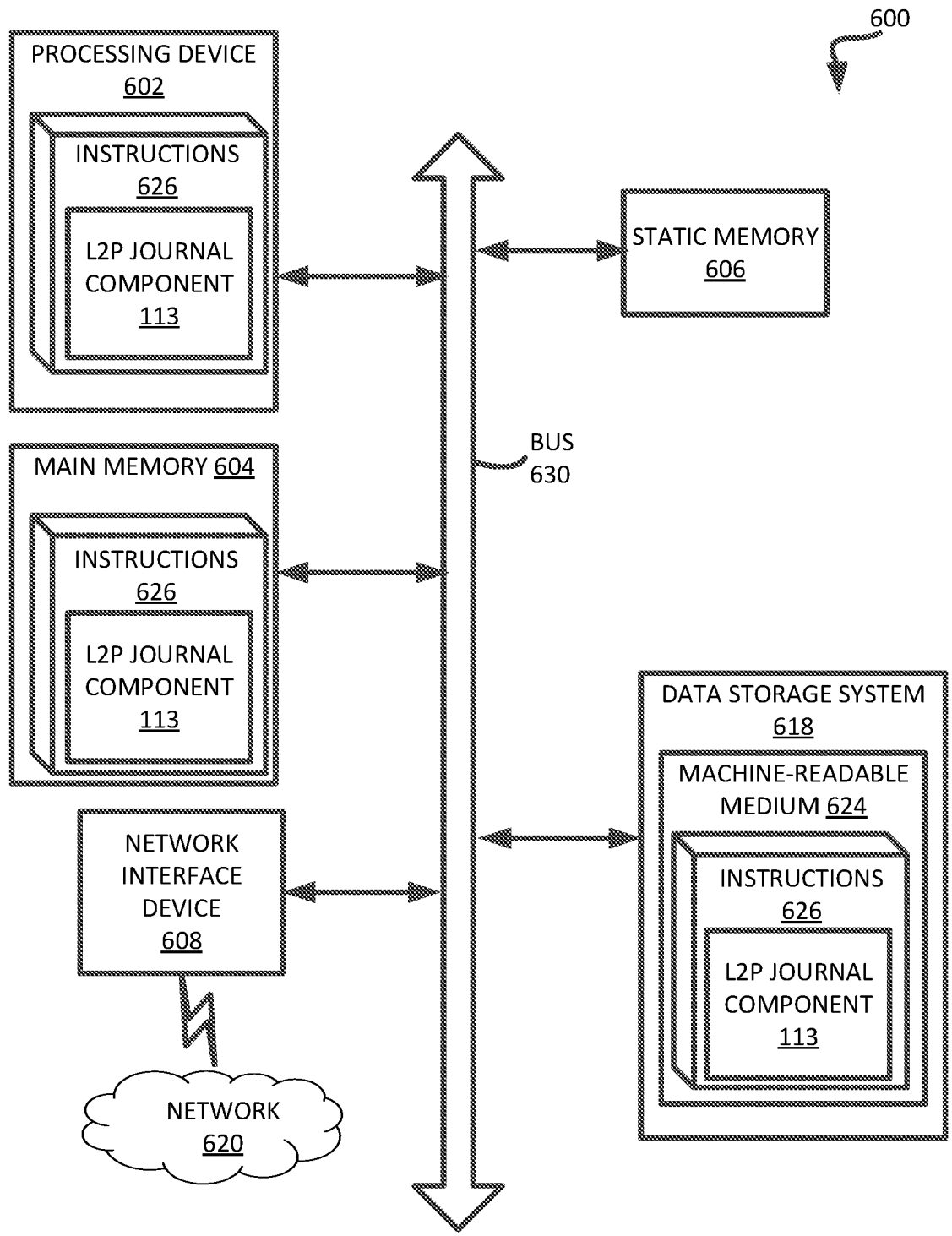
FIG. 10 is a block diagram of an example computer system in which embodiments of the present disclosure may operate.

FIG. 10 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the L2P journal component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a L2P journal component (e.g., the L2P journal component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-Docket readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled with the memory device, to perform operations comprising:
identifying, by the processing device, in a logical to physical (L2P) journal associated with the memory device, a first journal entry reflecting a two pass programming operation, wherein the two pass programming operation comprises a first pass to program data to a second memory location identified by a second physical address in a quad level cell (QLC) memory device, and wherein the two pass programming operation further comprises a second pass to program the data to the second memory location identified by the second physical address;
determining that the second pass of the two pass programming operation is complete responsive to detecting one or more of: a) an invalid value indicated by an entry in a queue associated with the two pass programming operation or b) a mismatch between a first version identifier indicated by the entry in the queue and a second version identifier indicated by the first journal entry;
responsive to determining that the second pass of the two pass programming operation is complete, causing a second journal entry of the L2P journal to associate a first physical address identifying a first memory location storing the data in a single level cell (SLC) cache with the second physical address, wherein the second journal entry corresponds to the first pass of the two pass programming operation; and
responsive to detecting a power up event following a power loss, reconstructing a L2P table using the second journal entry.

2. The system of claim 1, wherein the operations further comprise:
programming the data in the first memory location comprises a set of SLC blockstripes; and
migrating the data from the first memory location to the second memory location for the two pass programming operation, wherein the second memory location comprises a QLC blockstripe.

3. The system of claim 2, wherein programming the data in the first memory location further comprises adding the second journal entry to the L2P journal, wherein the second journal entry indicates that the data is programmed at the first memory location identified by the first physical address.

4. The system of claim 2, wherein the operations further comprise adding the first journal entry to the L2P journal in response to identifying the QLC blockstripe for the two pass programming operation, wherein the first journal entry indicates that the data is programmed by the two pass programming operation.

5. The system of claim 2, wherein the operations further comprise:
adding a queue entry to a queue in response to identifying the QLC blockstripe for the two pass programming operation; and
taking a snapshot of the queue at a power loss event, wherein the queue entry indicates whether the two pass programming operation is in progress.

6. The system of claim 5, wherein the power loss event is an asynchronous power loss event or a controlled power down event.

7. The system of claim 2, wherein the operations further comprise performing, based on the second journal entry, a L2P translation by translating a logical address to the second physical address.

8. A method, comprising:
identifying, by a processing device, in a logical to physical (L2P) journal associated with a memory device, a first journal entry reflecting a two pass programming operation, wherein the two pass programming operation comprises a first pass to program data to a second memory location in a quad level cell (QLC) memory device identified by a second physical address in a quad level cell (QLC) memory device, and wherein the two pass programming operation further comprises a second pass to program the data to the second memory location identified by the second physical address;
determining that the two pass programming operation has been interrupted by a power loss event responsive to detecting one or more of: a) an invalid value indicated by an entry in a queue associated with the two pass programming operation or b) a mismatch between a first version identifier indicated by the entry in the queue and a second version identifier indicated by the first journal entry;
responsive to determining that the two pass programming operation has been interrupted during a power loss event, causing a second journal entry of the L2P journal to associate a first physical address identifying a first memory location storing the data in a single level cell (SLC) cache with the second physical address, wherein the second journal entry corresponds to the first pass of the two pass programming operation; and
responsive to detecting a power up event following a power loss, reconstructing a L2P table using the second journal entry.

9. The method of claim 8, further comprising:
programming the data in the first memory location comprises a set of SLC blockstripes; and migrating the data from the first memory location to the second memory location for the two pass programming operation, wherein the second memory location comprises a QLC blockstripe.

10. The method of claim 9, wherein programming the data in the first memory location further comprises adding the second journal entry to the L2P journal, wherein the second journal entry indicates that the data is programmed at the first memory location identified by the first physical address.

11. The method of claim 9, further comprising adding the first journal entry to the L2P journal in response to identifying the QLC blockstripe for the two pass programming operation, wherein the first journal entry indicates that the data is programmed by the two pass programming operation.

12. The method of claim 9, further comprising:
   adding a queue entry to a queue in response to identifying the QLC blockstripe for the two pass programming operation; and
   taking a snapshot of the queue at a power loss event, wherein the queue entry indicates whether the two pass programming operation is in progress.

13. The method of claim 8, further comprising performing, based on the second journal entry, a L2P translation by translating a logical address to the second physical address.

14. A non-transitory computer-readable storage medium comprising instructions that, when executed by a processing device, cause the processing device to perform operations comprising:
   identifying, by a processing device, in a logical to physical (L2P) journal associated with a memory device, a first journal entry reflecting a two pass programming operation, wherein the two pass programming operation comprises a first pass to program data to a second memory location identified by a second physical address in a quad level cell (QLC) memory device, and wherein the two pass programming operation further comprises a second pass to program the data to the second memory location identified by the second physical address;
   determining that the second pass of the two pass programming operation is complete responsive to detecting one or more of: a) an invalid value indicated by an entry in a queue associated with the two pass programming operation or b) a mismatch between a first version identifier indicated by the entry in the queue and a second version identifier indicated by the first journal entry;
   responsive to determining that the second pass of the two pass programming operation is complete, causing a second journal entry of the L2P to associate a first physical address identifying a first memory location storing the data in a single level cell (SLC) cache with the second physical address, wherein the second journal entry corresponds to the first pass of the two pass programming operation; and
   responsive to detecting a power up event following a power loss, reconstructing a L2P table using the second journal entry.

15. The non-transitory computer-readable storage medium of claim 14, wherein the operations further comprise:
   programming the data in the first memory location comprises a set of SLC blockstripes; and
   migrating the data from the first memory location to the second memory location for the two pass programming operation, wherein the second memory location comprises a QLC blockstripe.

16. The non-transitory computer-readable storage medium of claim 15, wherein programming the data in the first memory location further comprises adding the second journal entry to the L2P journal, wherein the second journal entry indicates that the data is programmed at the first memory location identified by the first physical address.

17. The non-transitory computer-readable storage medium of claim 15, wherein the operations further comprise adding the first journal entry to the L2P journal in response to identifying the QLC blockstripe for the two pass programming operation, wherein the first journal entry indicates that the data is programmed by the two pass programming operation.

18. The non-transitory computer-readable storage medium of claim 15, wherein the operations further comprise:
   adding a queue entry to a queue in response to identifying the QLC blockstripe for the two pass programming operation; and
   taking a snapshot of the queue at a power loss event, wherein the queue entry indicates whether the two pass programming operation is in progress.

19. The non-transitory computer-readable storage medium of claim 18, wherein the power loss event is an asynchronous power loss event or a controlled power down event.

20. The non-transitory computer-readable storage medium of claim 15, wherein the operations further comprise performing, based on the second journal entry, a L2P translation by translating a logical address to the second physical address.

* * * * *